UNITED STATES PATENT OFFICE.

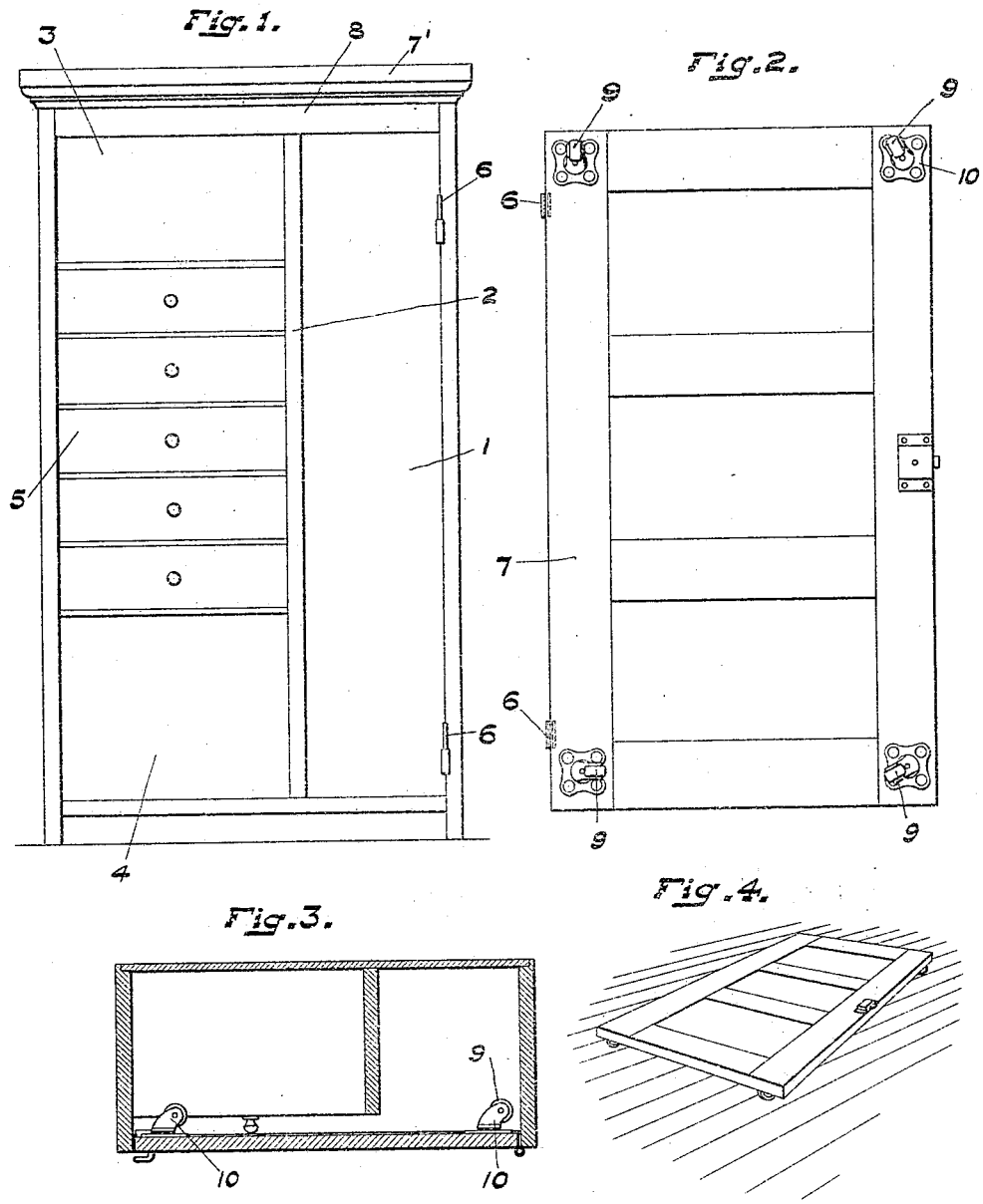

FREDERICK A. MUELLER, OF INDIANAPOLIS, INDIANA.

COMBINED CABINET AND AUTOMOBILE-REPAIR TRUNDLE-PLATFORM.

1,297,224.  Specification of Letters Patent.  Patented Mar. 11, 1919.

Application filed April 12, 1917. Serial No. 161,630.

*To all whom it may concern:*

Be it known that I, FREDERICK A. MUELLER, a citizen of the United States, residing at Indianapolis, Marion county, and State of Indiana, have invented and discovered certain new and useful Improvements in Combined Cabinets and Automobile-Repair Trundle-Platforms, of which the following is a specification.

My invention relates to combined tool cabinets and trundle platforms for automobile repair work and its object is to provide a structure particularly adaptable for use in automobile repair garages and so constructed that the door for the cabinet may be readily detached and used as a supporting platform which may be moved under the automobile and on which the repair mechanic may lie while repairing the automobile for the purpose of supporting him above the floor.

To this end my invention is embodied in preferable form in the construction and arrangement hereinafter described and illustrated in the accompanying drawings.

In these drawings, Figure 1 is a front view in elevation of a cabinet with the door removed therefrom; Fig. 2, an inside view in elevation of the door; Fig. 3, a cross section and Fig. 4, a perspective view of the door employed as a trundle platform in the position in which it is adapted to be used in repair work.

Referring to the drawings, the cabinet as particularly illustrated herein consists of an upright structure provided with a vertical compartment 1, extending the full height of the cabinet and adapted to receive tools of considerable length and 2 indicates a vertical partition separating the compartment 1 from the remaining space of the cabinet. Such remaining space comprises an upper compartment 3 and a lower compartment 4 and an intermediate series of sliding drawers 5, which drawers are adapted to receive small tools and parts.

Detachably hung on the outer front post of the cabinet by hinges 6 is an elongated door 7 adapted to extend substantially the full height of the cabinet and of a length sufficient to afford a support for the body of the repair mechanic when stretched at full length and lying in such position under the automobile, for the purpose of effecting repairs. This door terminates short of the projecting molding 7' at the top of the cabinet and meets a finishing strip 8, the separation between the end of the door and the molding being of a sufficient length to permit the door to be lifted readily from its hinges, without contact with the molding.

On its rear face at the four corners thereof, the door is provided with trundle wheels 9, which are held in short caster supports 10 projecting only a slight distance from the inner surface of the door. The two trundle wheels on the inner edge of the door project into the compartment 1 and the other wheels project respectively into the compartments 3 and 4, when the door is closed, whereby there is no interference between the wheels and the interior structure of the cabinet.

By providing a door of the dimensions specified and with the trundle wheels and the detachable connection thereof with the cabinet, a rolling support platform or scaffold of sufficiently shallow depth to enable it to be readily rolled under an automobile is provided and on which the repair man can lie stretched at full length while engaged in repairing the under frame structure of the car above him. When not in use for repair work, the platform is attached to the cabinet and forms a closure for the front thereof, not only providing an additional function for the platform, but also means for enabling it to be removed from obstructing position on the floor and thus providing a convenient way of disposing of the platform when not in use for repair work.

Having thus described my invention, what I claim is:—

A combined cabinet and trundle platform for automobile repair work comprising a hollow cabinet body, a detachable door forming a closure therefor having inner and outer plane surfaces from end to end, said door being provided with rolling supports on the inner surface thereof, having short supporting members, said rolling supports being adapted to be received within the hollow cabinet body when the door is closed, the rolling supports being adapted to carry the door on the floor to constitute a trundle platform for repair work under an automobile body.

In witness whereof, I have hereunto set my hand and seal at Indianapolis, Marion county, Indiana, this 9th day of April, A. D. nineteen hundred and seventeen.

FREDERICK A. MUELLER. [L. S.]

Witnesses:
 A. C. RICE,
 H. P. DOOLITTLE.

Copies of this patent may be obtained for five cents each, by addressing the "Commissioner of Patents, Washington, D. C."